Patented Mar. 18, 1924.

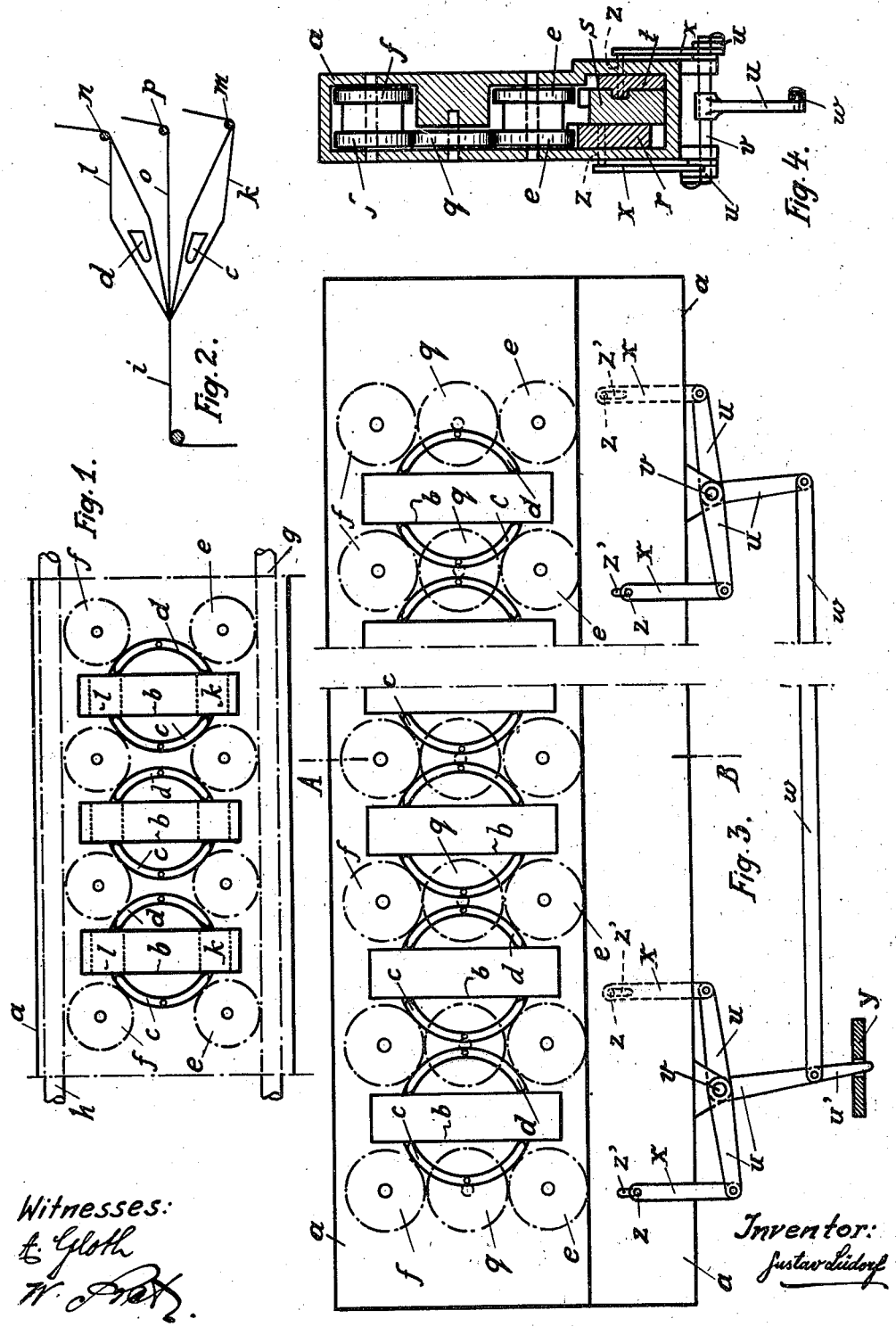

1,487,172

UNITED STATES PATENT OFFICE.

GUSTAV LÜDORF, OF BARMEN, GERMANY, ASSIGNOR TO THE FIRM OF: GUSTAV LÜDORF & SOHN, G. M. B. H., OF BARMEN, GERMANY.

LATHE FOR RIBBON LOOMS.

Application filed March 25, 1922. Serial No. 546,894.

*To all whom it may concern:*

Be it known that I, GUSTAV LÜDORF, a citizen of the German Republic, and residing at Barmen, Germany, have invented certain new and useful Improvements in Lathes for Ribbon Looms, of which the following is a specification.

This invention has for its object to make double-ply ribbon, hollow ribbon, and the like, by means of a lathe in which two shuttles work at the same time, that is two shuttles are provided for each ribbon, which are not reciprocated as in the hitherto known ribbon-looms but guided continuously in one and the same direction within a circular path.

The accompanying drawing shows two appropriate constructional forms of putting the invention into practice:

Fig. 1 is a diagrammatical front view of the improved lathe;

Fig. 2 is a diagram for explaining the operation of the latter;

Fig. 3 is a similar view to Fig. 1, showing however a particular driving mechanism for the shuttles;

Fig. 4 is a cross-section on the line A—B of Fig. 3; the figures, being diagrammatic, do not show the teeth of the gears $e$, $f$ while $g$, $h$ represent worm shafts.

Referring to Fig. 1: In the lathe $a$, passage-ways $b$ for the warps are provided. The two shuttles $c$ and $d$ for each ribbon move in a circular path, toothed wheels $e$ and $f$ serving to operate said shuttles. Said toothed wheels $e$ and $f$ are rotated by two worms $g$ and $h$ which act when the shed is opened. The rotation of the toothed wheels $e$ and $f$ in a continuous direction may also be effected in any other appropriate way.

The lathe serves, as mentioned, for making hollow ribbon, double-ply ribbon, and the like. The operation may be explained with reference to Fig. 2, in which $i$ designates the ribbon. To make pure hollow web, two sheds $k$ and $l$ are formed simultaneously, through which the shuttles $c$ and $d$ pass simultaneously. $m$ is the guiding-bar for the warps of the shed $k$, while $n$ is the guiding-bar for the warps of the shed $l$. To make double-ply ribbon for girths and the like, an additional warp $o$ is employed and is moved sometimes to the top of the shed $l$ and sometimes to the bottom of the shed $k$; $p$ being the guiding-bar for said additional warp $o$.

Owing to the two shuttles $c$ and $d$ for each ribbon working simultaneously, the capacity of a loom with the employment of the improved lathe is twice as large as with the employment of ordinary lathes when making the ware in question.

Referring to Figs. 3 and 4: The lathe $a$ is here also provided with passage-ways $b$ for the warps, two shuttles $c$ and $d$ for each ribbon moving in a circular path in a continuous direction and being operated by wheels $e$ and $f$. As shown in Fig. 4, the latter are provided with double toothed rims, the front rims being in gear with the shuttles and the rear rims meshing with an intermediary toothed wheel $q$, whereby the rotation of the lower wheels $e$ is transmitted in the same direction to the upper wheels $f$. For the purpose of attaining a uniform rotation of the lower wheels in the same direction, a particular arrangement of two toothed racks $r$ and $s$ is provided. Both said racks $r$ and $s$ can be shifted in upward or downward direction in such a way that in their raised position they are in gear with the lower toothed wheels $e$ while in their lowered position they are disengaged therefrom. The toothed rack $s$ can, furthermore, be moved to and fro in a way known in the art, while the toothed rack $r$ can be moved up and down only. The toothed rack $s$ is guided on a separate guiding-member $t$ which in the same way as the rack $r$ can also be moved up and down only. The operation is as follows: First, the toothed rack $s$ is in gear with the toothed wheels $e$, it being then laterally moved in a way known in the art until the shuttles have arrived from one end position at the other end position. Thereupon, the guiding-member $t$ together with the toothed rack $s$ is lowered and at the same time the toothed rack $r$ is raised until the toothed rack $s$ is disengaged from, and the toothed rack $r$ in gear with, the toothed wheels $e$ as shown in Fig. 4. In this case, the toothed rack $r$ serves only for arresting the toothed wheels $e$ and thus the shuttles $c$ and $d$ in position while the toothed rack $s$ is being returned to its initial position. This being completed, the guiding-member $t$ is again raised with the toothed rack $s$ until the latter is in gear with the toothed wheels $e$, the toothed rack $r$ being lowered at the same time until it is disengaged from the wheels $e$, the proceeding being then repeated, and so forth.

The alternate movement of the toothed racks $r$ and $s$ can, for instance, be effected in the way represented. At both ends of the lathe $a$, axles $v$ with co-acting three-arm levers $u$, $u$, $u$ are mounted. The two downwardly directed lever arms $u$ are connected by means of a connecting-rod $w$, so that both axles $v$ are turned when the left-hand downwardly directed lever arm $u$, which has a downward extension $u'$ engaging a slotted guide $y$, is rocked by the movement of the lathe during the working of the loom, whereby the lateral lever arms $u$, $u$ move up and down. The latter are connected by links $x$, $x$ and pins $z$, $z$ thereon with the toothed rack $r$ and the guiding-member $t$, said pins passing for this purpose through vertical guiding-slots $z'$ in the front and rear walls of the lathe $a$. By this arrangement, one toothed rack is raised when the other is lowered during the operation of said slotted guide $y$ by the working of the loom.

What I claim, is:—

In a loom lathe for making hollow ribbon, double-ply ribbon, and the like, in combination, passage ways for the warps, two shuttles for each passageway adapted to work simultaneously in a circular path and in a continuous direction and to pass alternately and successively through the upper and lower layer of the web, a set of toothed wheels in gear with said shuttles, a reciprocating rack adapted to be raised for its active engagement with said toothed wheels and to be lowered for disengagement from the latter during its return to its initial position, an up and down movable toothed rack adapted when raised to arrest said toothed wheels and thus said shuttles during the return way of the reciprocating toothed rack to its initial position, and means to effect said alternate movement of said toothed racks, substantially as set forth.

In testimony whereof I have hereunto set my hand in the presence of two subscribing witnesses.

GUSTAV LÜDORF.

Witnesses:
 HENRY W. HAAS,
 WILLIAM E. LANE.